(12) United States Patent
Maimets

(10) Patent No.: US 10,077,862 B2
(45) Date of Patent: Sep. 18, 2018

(54) APPARATUS AND METHOD FOR REPAIRING CULVERTS AND PIPES

(71) Applicant: Lembit Maimets, Richmond Hill (CA)

(72) Inventor: Lembit Maimets, Richmond Hill (CA)

(*) Notice: Subject to any disclaimer, the term of this patent is extended or adjusted under 35 U.S.C. 154(b) by 0 days.

(21) Appl. No.: 15/213,984

(22) Filed: Jul. 19, 2016

(65) Prior Publication Data

US 2017/0074448 A1 Mar. 16, 2017

Related U.S. Application Data

(60) Provisional application No. 62/196,114, filed on Jul. 23, 2015.

(51) Int. Cl.
*F16L 55/18* (2006.01)
*F16L 55/163* (2006.01)

(52) U.S. Cl.
CPC .......... *F16L 55/18* (2013.01); *F16L 55/163* (2013.01)

(58) Field of Classification Search
CPC ............................. F16L 55/18; F16L 55/163
USPC ................ 138/97, 98; 405/150.1, 184.2
See application file for complete search history.

(56) References Cited

U.S. PATENT DOCUMENTS

| | | | | |
|---|---|---|---|---|
| 1,843,334 A * | 2/1932 | McGrath | ............... | E21D 11/102 249/209 |
| 2,148,783 A * | 2/1939 | Spaulding | ............... | E21D 11/10 405/147 |
| 2,870,518 A * | 1/1959 | Bossner | ............... | B28B 7/30 425/468 |
| 3,206,824 A * | 9/1965 | Cerutti | ............... | E21D 9/12 405/138 |
| 3,970,200 A * | 7/1976 | Goetjen | ............... | E21D 11/40 405/148 |
| 4,050,255 A * | 9/1977 | Ahlgren | ............... | E21D 11/102 264/33 |
| RE30,929 E | 5/1982 | Maimets | | |
| 4,379,654 A * | 4/1983 | Rovelli | ............... | E21D 11/381 405/150.1 |
| RE34,053 E * | 9/1992 | Kennedy | ............... | E21F 1/10 405/132 |
| 5,190,705 A * | 3/1993 | Corazza | ............... | E03F 3/06 138/97 |
| 2014/0007968 A1 | 1/2014 | Maimets | | |
| 2015/0086272 A1* | 3/2015 | Li | ............... | E21D 11/10 405/150.1 |

* cited by examiner

*Primary Examiner* — James Hook
(74) *Attorney, Agent, or Firm* — Greenblum & Bernstein, P.L.C.

(57) ABSTRACT

An apparatus and method for repairing a damaged host pipe, such as a culvert or other conduit. A trough is positioned over the invert of the host pipe and a longitudinally successive series of ribs are positioned and expanded against the interior of the damaged host pipe and against the trough, the rib having one or more segments and a pair of circumferentially successive flaps hinged together. With a hydraulic jack or other appropriate pushing device, a pushing force is applied against the hinged flaps until the hinged flaps are locked in an installation position. Grout, such as a cementitious grout is then installed in spaces between the trough and the host pipe. Alternatively, the ribs extend transversely beneath the trough, but not beyond the longitudinal edges of the trough, and the trough is anchored to the host pipe.

11 Claims, 7 Drawing Sheets

APPARATUS AND METHOD FOR PREPAIRING CULVERTS AND PIPES

CROSS-REFERENCE TO RELATED APPLICATION

This application is based upon U.S. Provisional Patent Application No. 62/196,114, filed Jul. 23, 2015, the disclosure of which is hereby incorporated by reference thereto in its entirety, and the priority of which is claimed under 35 USC § 119(e).

BACKGROUND

1. Field of the Invention

The invention relates to apparatuses and methods for repairing culverts and pipes, typically underground culverts and pipes. More particularly, the invention relates to apparatuses and methods for repairing inverts of such culverts that have become eroded, corroded, or otherwise damaged.

2. Description of Background

Over time, drainage or sewer pipes, or culverts, become eroded or corroded by means of the sand or other particulates in the water or fluid and, particularly, the inverts of such conduits. For example, in the case of galvanized pipes or culverts, the galvanization becomes eroded or corroded, thereby wearing away the galvanization and thereby allowing physical damage to the underlying pipe or culvert and thereby resulting in leaks or collapse, for example, of the pipe or culvert.

The prior art discloses various ways of repairing culverts and pipes of various types, particularly underground conduits, whereby the entirety of sections of such conduits are reinforced or replaced.

But certain types of conduit damage, or the most significant damage, occurs in the area of the invert, that is, the inside bottom of the conduit or, in transverse cross section, the inside bottom arc within which the water or liquid flows.

SUMMARY

The invention is directed to apparatuses and methods for repairing culverts or pipes and, more particularly, for repairing the inverts of such conduits.

According to the invention, a trough made of metal or plastic material is affixed over, that is, lines a deteriorated invert of the conduit, thereby restoring the conduit, or channel.

The trough according to the invention, can be fixed to the host pipe material by any of the following:

1. Being bolted to the host pipe wall;
2. Leaving an annular space between the trough material and host pipe and filling it with cement, or polymer grout and anchoring the trough to the grout;
3. Providing expandable circular ribs to hold down the trough; or
4. Providing circular ribs to which the trough material is mechanically connected.

BRIEF DESCRIPTION OF DRAWINGS

Features and advantages of the present invention will become apparent from a review of the detailed description of exemplary embodiments of the invention, which follows, when considered in the light of the accompanying drawings, in which.

DETAILED DESCRIPTION

The drawings are given as examples and are not limiting to the invention. They are schematic illustrations intended to facilitate the understanding of the invention and are not necessarily to scale for practical applications.

Reference is made to the patent documents U.S. Pat. No. RE 30,929 and to U.S. Patent Application Publication No. 2014/0007968-A1 for descriptions of the state of the art in the field of endeavor to which the present invention relates, the disclosures of these two patent documents being hereby incorporated by reference thereto in their entireties. Included in the disclosures of these two patent documents are references to locking flaps and hinges, which are also referenced in the following description.

The invention relates to apparatuses and methods for repairing culverts, pipes, trenches, conduits, or tunnels, etc. For convenience, the term "culvert" or "pipe" is used in the following description, but the term is not to be considered limiting in terms of that which conveys the water or other liquid therealong. More particularly, the invention relates to apparatuses and methods for repairing inverts of such culverts that have become eroded or corroded.

In civil engineering, the invert—or invert level—is the bottom, or base, interior level of a culvert or pipe, etc.; it can also be considered the "floor" level. Conversely, the crown level is the highest interior level, and can be considered the "ceiling" level. The invert level allows the slope of the pipe to be set at various points so that the fluid being conveyed therein will flow by gravity. Using the inside bottom instead of the outside bottom level avoids problems that could occur if different pipe thicknesses of a pipe are used. Although not limiting, the arc of an invert of can extend transversely as necessary according to the extent of the damage to the bottom of the host pipe, that is, the invert. For example, the width could be as little as approximately 30 degrees of the pipe circumference to 180 degrees or more.

Exposure of the invert section of a culvert, or simply "invert," to water/sewage and sand, or other substances, over a period of time can cause the invert to become eroded or corroded by means of the sand or other particulates in the water or fluid. For example, in the case of galvanized pipes or culverts, the galvanization can become eroded or corroded, thereby wearing away the galvanization and thereby allowing physical damage to the underlying pipe or culvert, the invert in particular, thereby resulting in leaks or collapse, for example.

Installation equipment and materials used will next be described with reference to the appended drawing figures.

Figure 11:
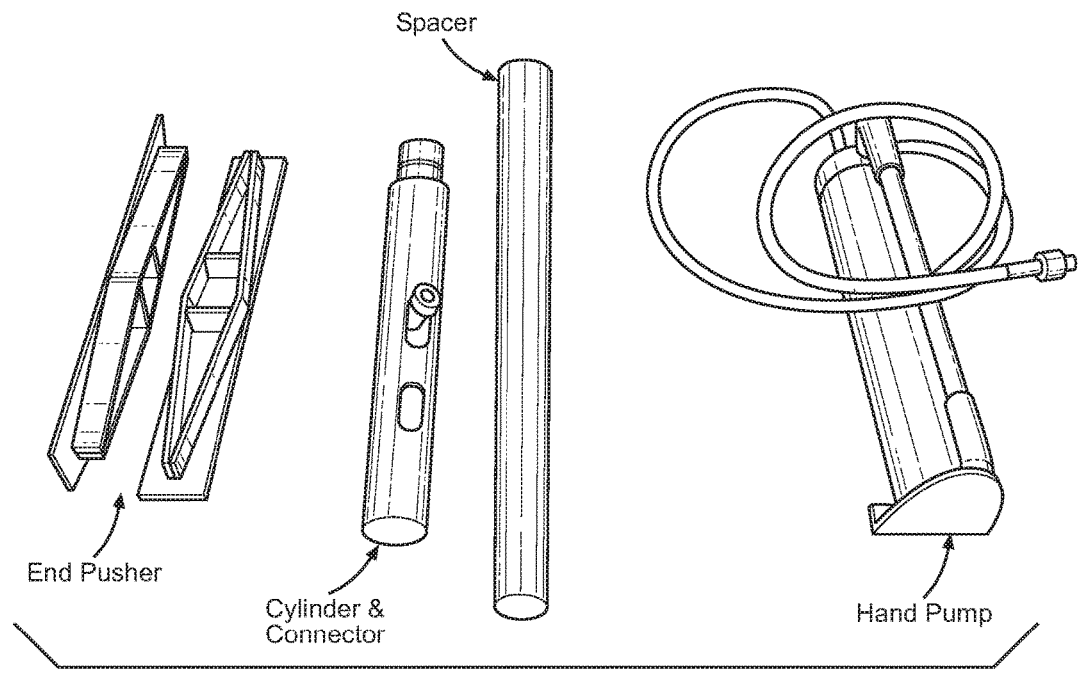
FIG. 11 is a view of various equipment used for a hydraulic jack used in the installation.
Figure 12:
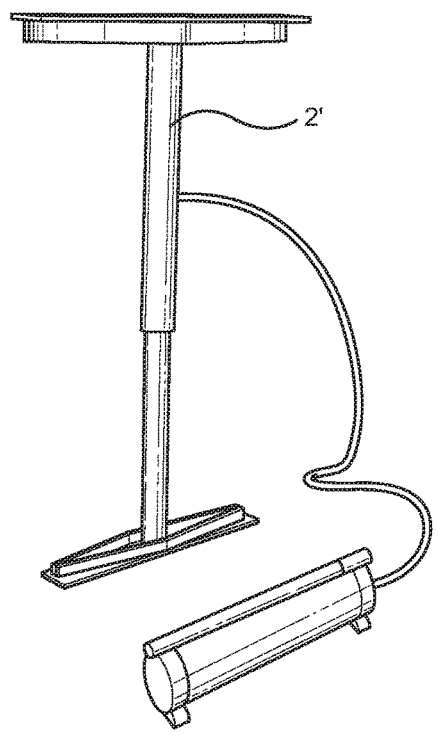
FIG. 12 is the equipment of FIG. 11 assembled for use.

The minimum equipment required are the vertical jack assembly 2' with hose assembly, hydraulic pump and required fittings. See, for example, FIGS. 10-12. The jack assembly should have quick couplers. Other equipment that can be utilized includes winches and cables for installation. Materials include temporary supports 2 to secure the repaired structure if host pipe become oval, or weakened because of structural deformation. See, for example, FIGS. 1, 2, and 7. Yet other temporary supports are needed to avoid Trough deformation during grouting process.

Figure 1:
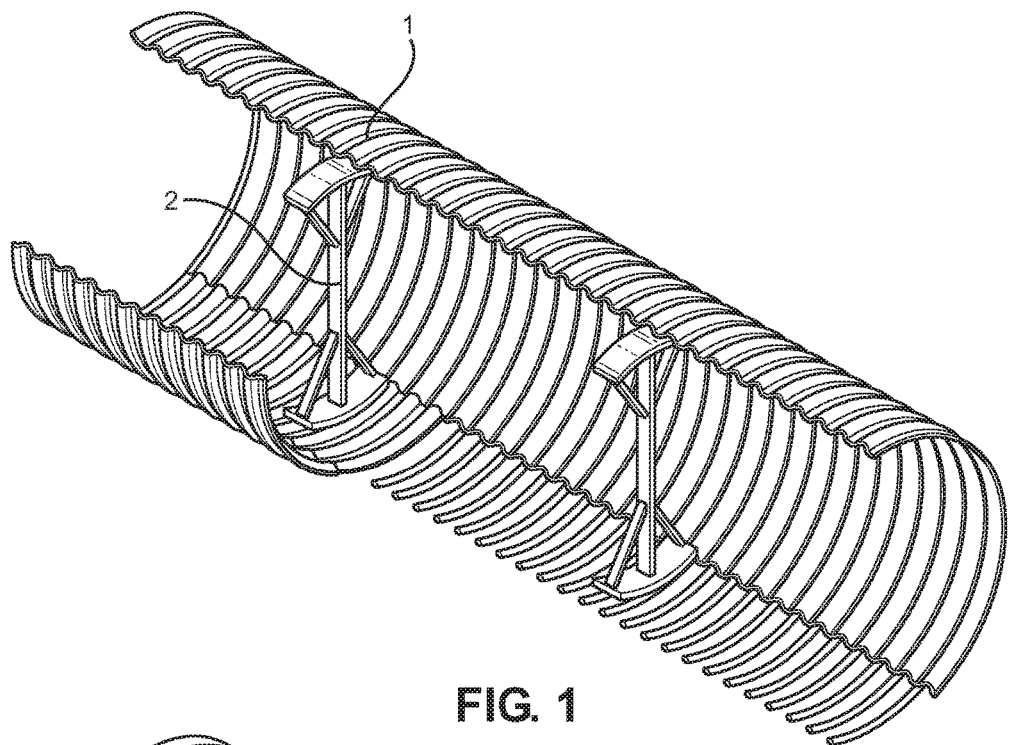
FIG. 1 is a schematic illustration of a structurally deformed host pipe, or culvert, in the form of a corrugated metal pipe, temporarily supported prior to repair according to the invention.

The culvert being repaired should be cleaned prior to installing the rib and trough system of the invention. Any obstruction(s), such as any that protrude more than ⅛" from the inner surface of the culvert, any loose pipe pieces and any solid objects should be removed. If the host pipe 1 has become oval, or weakened because of structural deformation, it should be repaired before the rib and trough installation is begun. As shown in FIG. 1, temporary supports 2 can be used to secure the culvert under repair.

Figure 2:
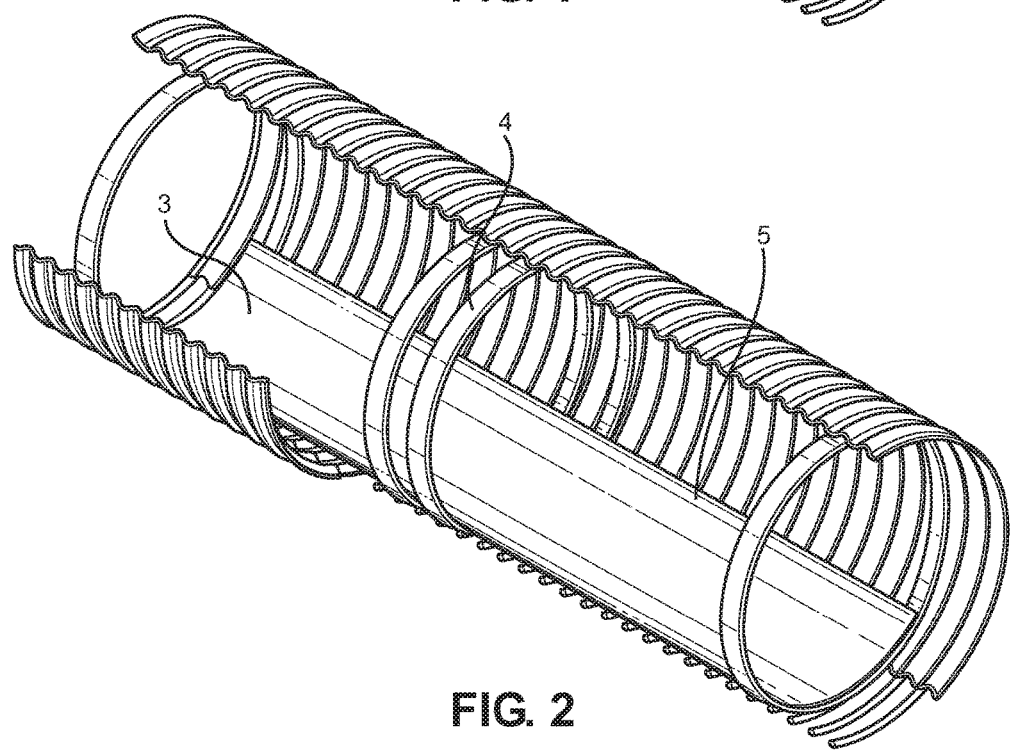
FIG. 2 is a schematic illustration of the host pipe of FIG. 1, in which a repair trough is positioned over the invert.
Figure 3:
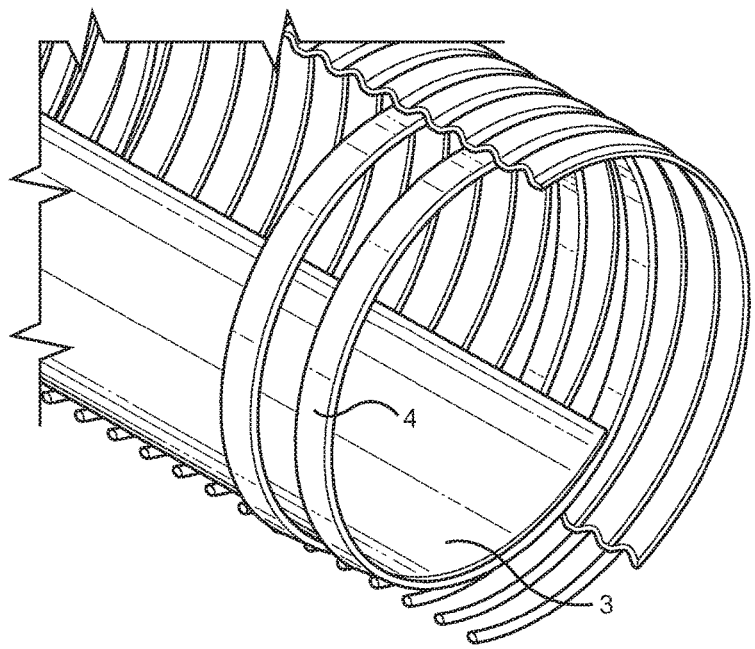
FIG. 3 is an enlarged section relating to a portion of the illustration of FIG. 2.
Figure 8:
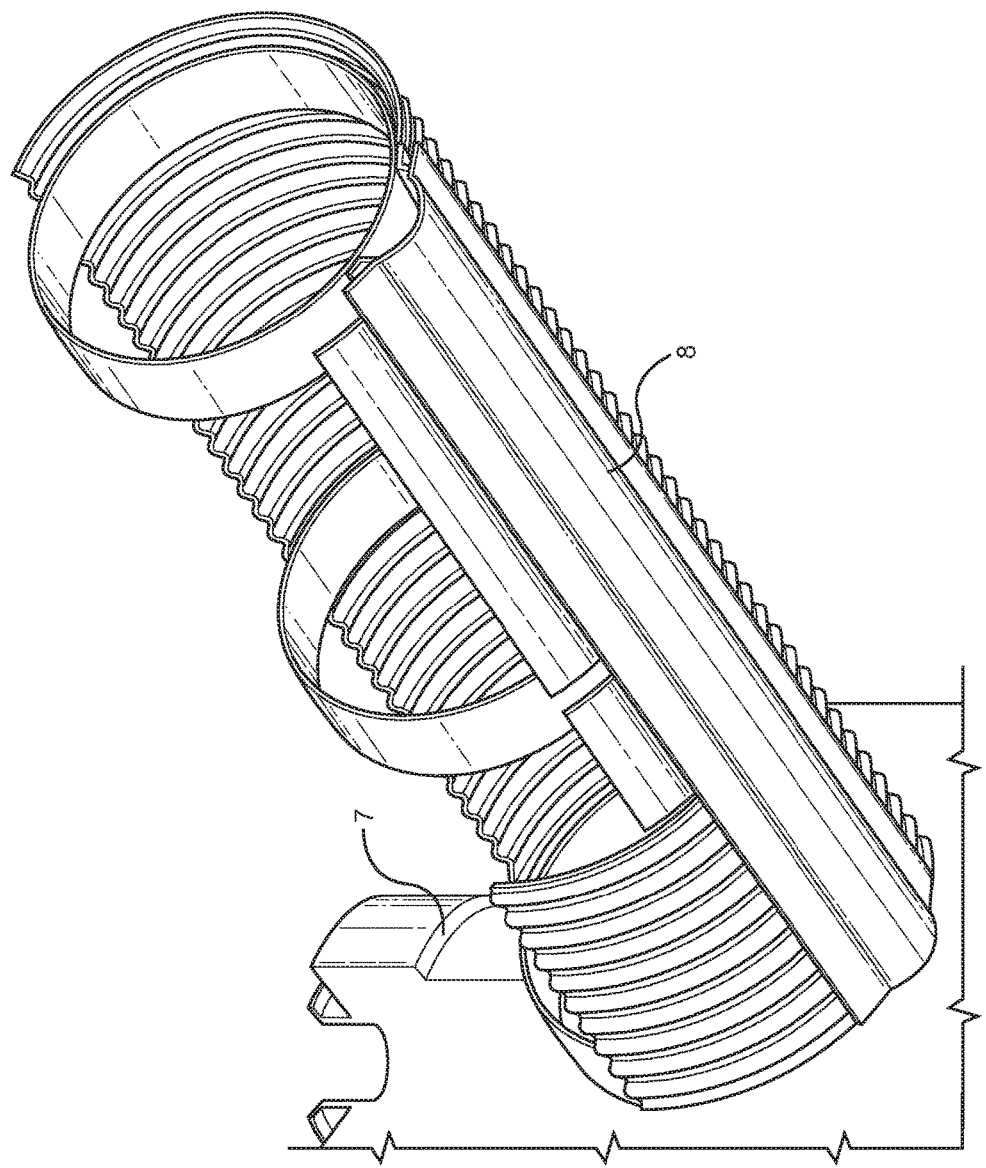
FIG. 8 is a schematic illustration of grout being pumped in the spaces between the trough and culvert.

The trough(s) 3 should be laid out before the ribs are installed. Also, if the bottom of the host pipe, that is, the invert, is damaged sufficiently, it might be necessary to add cementitious grout or other filling material to the host pipe, as indicated schematically by reference numeral 8 in FIG. 8. The troughs can have lengths of four or eight feet and can be cut for shortening as needed and can be abutted end-to-end to accommodate the length of the culvert (that is, host pipe) in need of repair. In the case of a culvert in the form of corrugated metal pipe (CMP), supports from closed-celled polyethylene foam (foam sealer) should be placed in the pipe under the curved edges of the troughs (as would be done as shown in FIG. 2). Such foam sealer can be adhered to the crest of the CMP as a closed loop. The rib 4 can then be transported into the pipe. In some cases the ribs are disassembled for easy access the repair location. That is, they can be disassembled in sections at the hinges and/or folded at the hinges. Then, when the rib arrives to the projected location, the hinges can then be unfolded or reassembled. For the first and last ribs, a second foam sealer is then placed above the trough between the host pipe and the rib to prevent rib grouting from escape, as would be seen and understood from FIG. 3.

Figure 4:
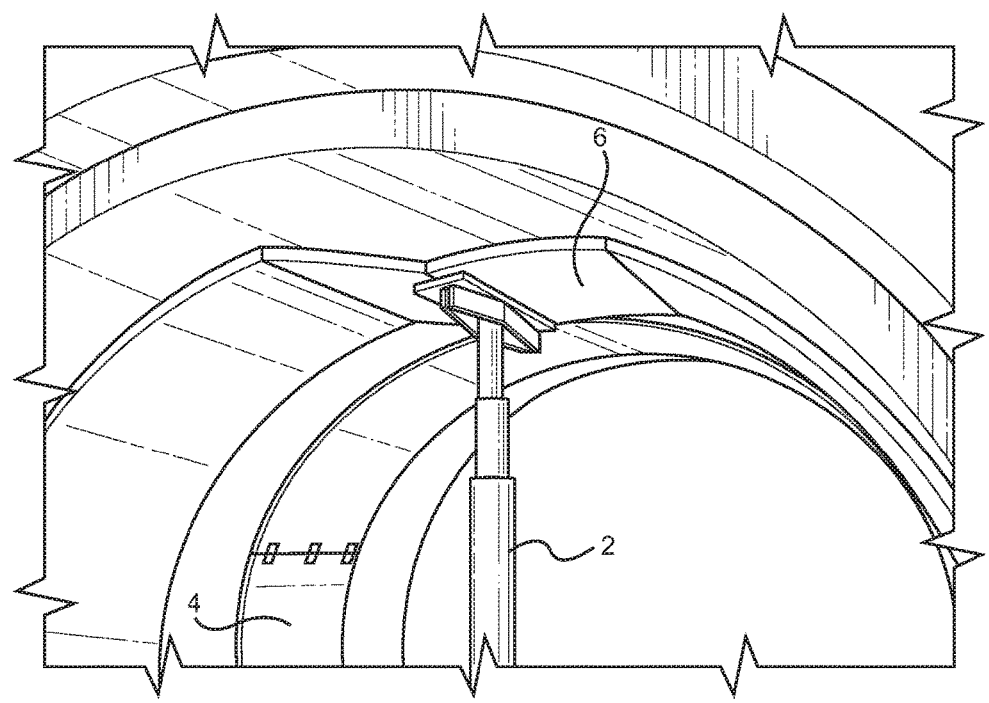
FIG. 4 is an illustration of the inner top portion of the host pipe, with a hydraulic jack positioned to expand a rib in place against the host pipe.

Next, the ribs 4 are expanded. Only a single hydraulic jack is needed for the installation of the repair, according to the invention. As shown in FIG. 4, the jack is set up vertically, supported on the bottom plate pushing up to the "flaps," or "locking flaps." Then, the jack is expanded carefully while the tongues in line with the hinge pins of the flaps on both sides into the grooves are observed. Expanding the jack always pushes the flaps to spring out, in the form an over-center locking device, with a snapping sound. That indicates to the installer a good and tight installation.

Figure 5:
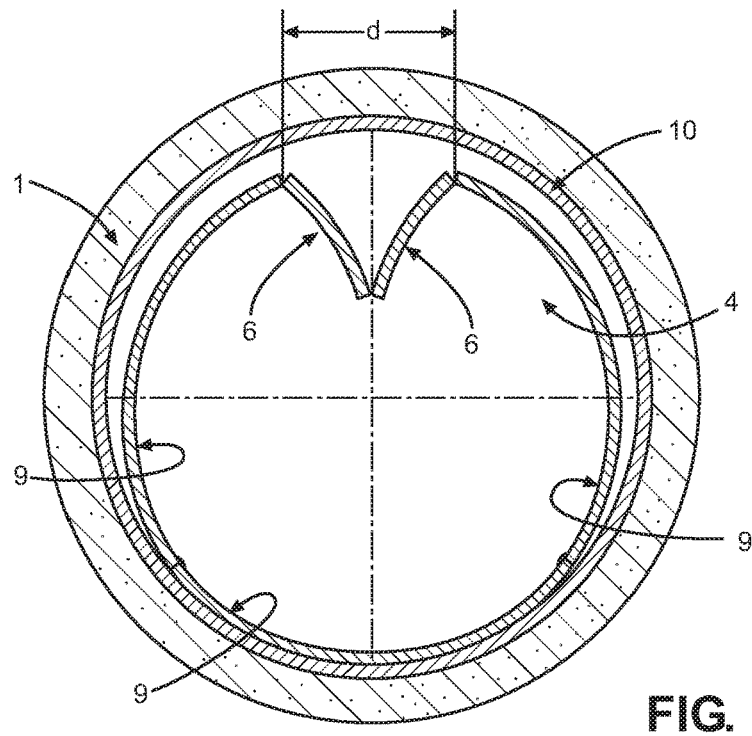
FIG. 5 is a schematic illustration of the rib, such as in FIG. 4, in the pre-installed position.
Figure 6:
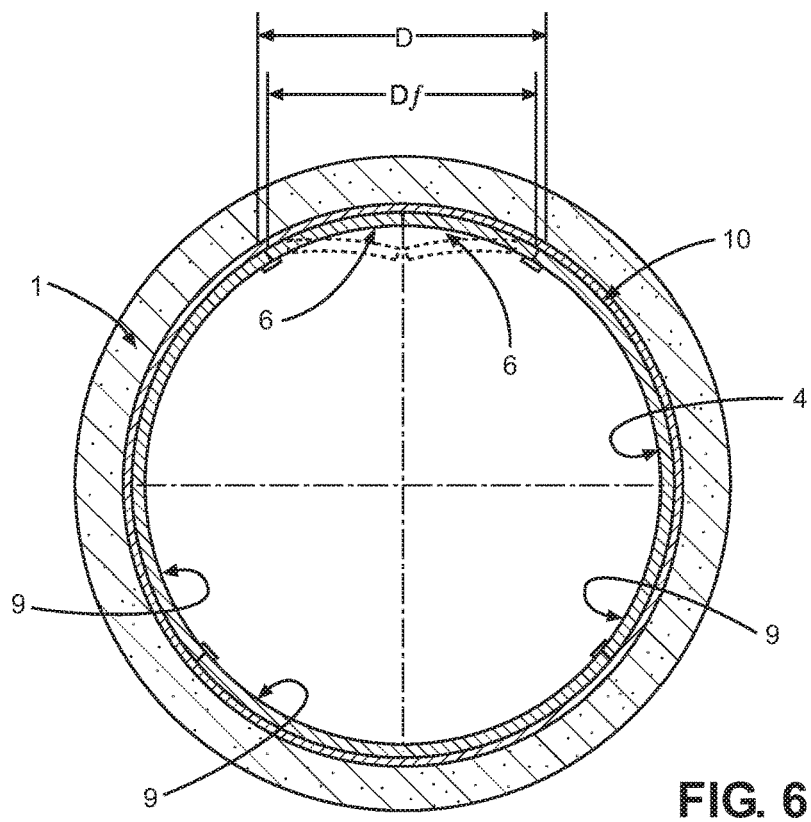
FIG. 6 is a schematic illustration of the rib, such as in FIG. 4, in the installed position, with an intermediate position shown in broken lines.

FIGS. 5 and 6 schematically illustrates the aforementioned over-center locking device in the context of the invention, that is, how a repair sleeve, such as in the context of the aforementioned US 2014/0007968-A1, or how a repair rib in the context of the instant invention, is moved from a pre-installation to an installed position. And while the current invention is shown in the context of a culvert or host pipe having a circular cross section, the invention can be used with a host pipe having an oval or arch or horseshoe cross section, such as that shown in the aforementioned US 2014/0007968-A1. The rib 4 comprises locking flaps 5 located in the crown arch area of the pipe 1, segment or segments 9, and optional resilient padding 10 located at the ends of the rib 4. The quantity of segments 9 depends on host pipe and/or access point dimensions. In FIGS. 5 and 6 are shown three segments 9.

In the pre-installation configuration (FIG. 5) the rib 4 has a shortest collapsed perimeter because the collapsed perimeter includes the shortest distance "d" between locking flaps 6. In the installed position (FIG. 6), the flaps 6 passed a straight line at which the flaps were being subjected to maximum compression stress because of largest perimeter (with largest distance "D") and locked in final expanded position with slightly smaller distance "Df".

Figure 7:
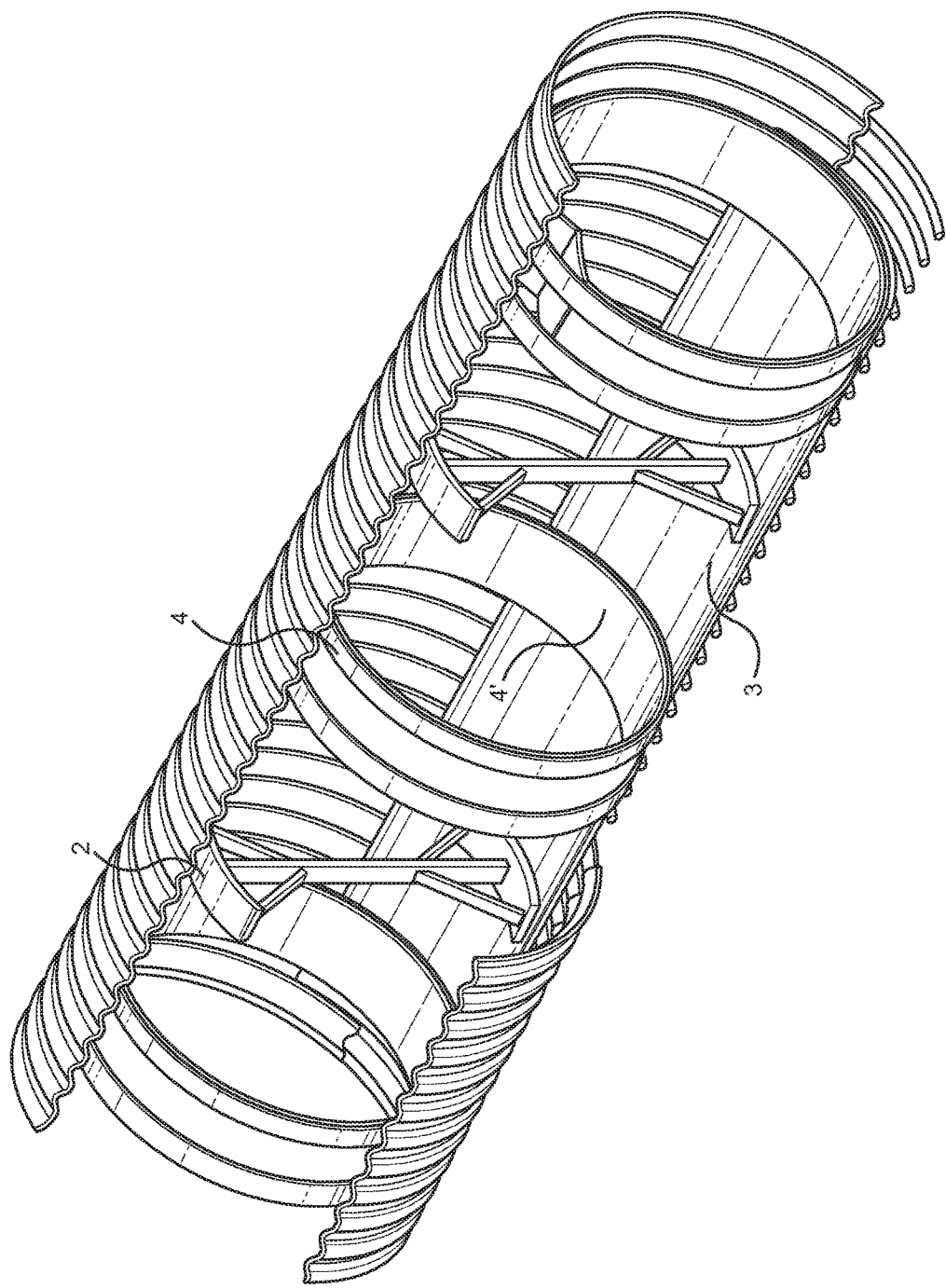
FIG. 7 is a schematic illustration of hydraulic jacks, or temporary supports, before grout is pumped into spaces between the trough and the culvert.

The foam sealer creates a holding force that prevents the rib 4 from becoming loose. Predrilled holes in the rib bottom piece can be used to secure the rib 4 to the trough 3 with stainless steel self-tapping screws, for example. The next successive rib 4 is installed at a specified distance from the previous one. In FIG. 7, the closest rib shown is not yet installed.

Next, grouting is added. See FIG. 8, for example. The rib is designed to have an annular space between the outside of the rib and the inside of the culvert. This space must be filled to provide a load transfer medium in case of damaged pipe repair or a sealer in case of infiltration. If a cementitious grout is used, easy flow cement can be pumped into the annular space through grouting ports located at 10 and 2 o'clock positions. Once the cement is cured, the rest of the annular space is filled with cement through a grouting port located at the crown (12 o'clock). The same cementitious grout is pumped for the troughs 3 through the gaps between the troughs and the culvert. In order to avoid big buoyancy forces, the space between troughs and culvert are only partially filled with cement and it is allowed to set before filling it fully, as can be understood from FIG. 6. As shown in FIG. 7, temporary supports 2 can be used to avoid trough deformation during the grouting process. All vent holes are then closed and the job is complete.

The following are considerations for performing the invention and using the equipment therefor. For example, metal hinges alone in the rib might not be strong enough to withstand installation forces. Their purpose is only to guide the first tongue of the flap into the groove of segments 'S'. The tongues provide hinge strength for installation. It can, therefore, be important to watch that the tongue fits into the groove without slipping out. Slip-out may happen if hinges may have been twisted in transport or handling.

Figure 9:
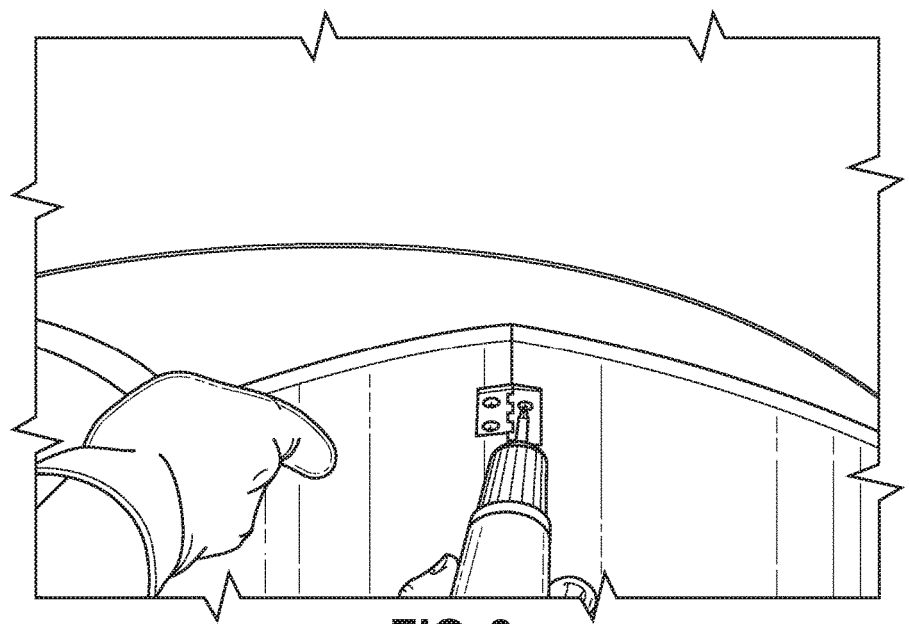
FIG. 9 is an illustration of the assembling of the top parts, a particular segment, and the flaps of a rib.
Figure 10:
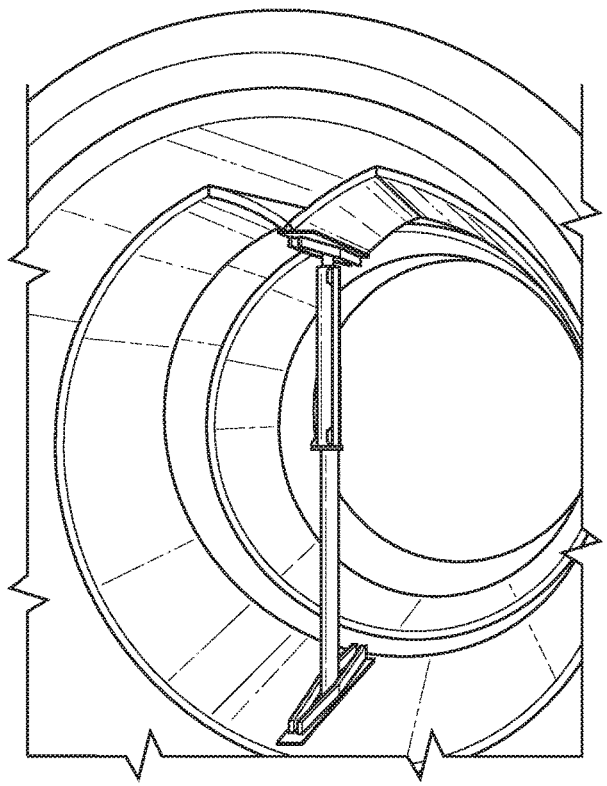
FIG. 10 is an illustration, like that of FIG. 4, of a jack being set up for the installation.

To install a rib, only one jack and one hydraulic pump is needed. For the hydraulic pump, model P80 from 'SIMPLEX' or 'ENERPAC' can be used. However, an installer should be aware that the jack is heavy and very slippery when working on PVC material. Therefore, the installer might want to set up the jack and try it once before the real installation. Further, in installing a rib, the bottom piece segment of the rib is prepared and placed on the trough. The second piece of the foam sealer is adhered to the crests of the corrugated host pipe just above the trough, and the foam sealer should match second curved end of the following rib, as can be understood in connection with FIG. 3. Next one of the side piece segments of the rib is prepared and set up. Then the hinges are secured. When assembling the rib, it should be kept in mind that three large grouting holes are located at the 10, 12, and 2 o'clock positions. Another side piece segment is next prepared and set up, and the hinges are screwed in place. Next, the top parts, segments, and the flaps are assembled. See FIG. 9. Then, the jack is set up for the installation, as shown in FIG. 10. The jack is slowly pumped, with caution, as the installation is completed.

When holding the sleeve, that is, the rib, one should never place hand/fingers to the sleeve/rib segment joints or the hand/finger might become jammed, as PVC material can be particularly slippery.

Before the jack is pumped up, one should ensure that all tongue grooves are matched. The jack should then be slowly pumped, with caution. When the pump becomes very tight, one should give about 20 seconds for the sleeve/rib to settle, such as after every two or three pumps. When all the ribs are installed, screw the 1¼6" NPT fittings are screwed to the side segment 'S' and a piece of flexible hose is connected for partial grout pumping. When the grout is cured, the rest of annular space is filled through the top segment "C" grouting port. Screw out The fittings are screwed out and the plugs are used to seal grouting holes. The same cementitious grout for the troughs are filled through the vent from the sides as mentioned above, in connection with grouting.

It should be noted that when assembling the side piece segments, the grouting ports must be located at the 10 o'clock and the 2 o'clock positions.

The following are details relating to the hydraulic jack set-up, according to that used by Link-Pipe, Inc. according to the invention, using its LPR 1010 jack. For the vertical jack set-up, the following is needed:

(1) one hydraulic cylinder of model #R1010 from 'SIMPLEX' or model #RC1010 from ENERPAC'. Each of these two kinds of cylinders has a 10 ton capacity with a 10-inch stroke.
(2) a steel pipe spacer (refer to the chart below) of 2.25" O.D. can be used to extend the height of the cylinder. The cylinder and the steel pipe spacer is joined with a connector of 24" length×2.25" I.D. (approximately) thin pipe.
(3). Two pieces of 3"×24" long heavy-duty channel iron, pushers at both ends.

A model #P-392 from 'ENERPAC' or model #P42 from 'SIMPLEX' hydraulic hand pump can be used to control the system. Lastly, the appropriate length of hydraulic hose and fittings will be needed.

| Spacer reference (In inches) | | | | | | | | |
| --- | --- | --- | --- | --- | --- | --- | --- | --- |
| Pipe Dia. | 36 | 39 | 42 | 48 | 54 | 60 | 66 | 72 |
| Spacer length | 10 | 13 | 16 | 22 | 28 | 34 | 40 | 46 |

The hydraulic cylinder has a 2.24" O.D., however, with paint the dimension can vary up to 2.29". The pipe selected to host the cylinder and the spacer (that is, here called the connector) may have to be about 2.29" I.D. or greater. Also, this cylinder host pipe as the connector wall thickness may be thinner as ⅛" in order for the whole assembly to be lighter in weight. The spacer wall thickness can be ³⁄₁₆" or greater.

According to an alternative embodiment, the ribs that are installed do not extend along the entirety of the interior circumference of the host pipe. Instead, each rib has a length that extends only along the arc beneath the trough(s). That is, the ribs do not extend upwardly beyond the longitudinal edges 5 of the troughs. In such an embodiment, the aforementioned hydraulic jack is not necessary. Instead, the ribs are anchored to the trough, below the trough, and grouting is nevertheless used within the spaces created or that exist therebetween. And, when a corrugated pipe is used, foam sealer can be used in a manner explained above.

Further, at least because the invention is disclosed herein in a manner that enables one to make and use it, by virtue of the disclosure of particular exemplary embodiments of the invention, the invention can be practiced in the absence of any additional element or additional structure that is not specifically disclosed herein.

The invention claimed is:

1. A method for repairing at least an inner bottom center of an invert of a host pipe in the form of a culvert or other conduit, said method comprising:
    positioning each of one or more troughs over the bottom center of the invert of the host pipe, the one or more troughs thereby extending along a longitudinal direction of the host pipe and thereby lining the invert without lining an entire interior circumference of the host pipe;
    positioning a plurality of longitudinally spaced-apart ribs to be expanded within the interior of the host pipe on each of the troughs, each of the ribs having one or more segments and a pair of circumferentially successive flaps hinged together;
    with a hydraulic jack or other pushing device, apply a pushing force against the hinged flaps until the hinged flaps are in an installation position; and
    installing grout in spaces between each of the one or more troughs and the host pipe.

2. A method according to claim 1, wherein:
    each of the ribs extends along the entirety of the interior of the host pipe.

3. A repair apparatus used for the method of claim 1.

4. A method according to claim 1, wherein:
    each of the one or more troughs has a transversely extending arc extending between 30 and 180 degrees.

5. A method according to claim 4, wherein:
    said positioning one or more troughs comprises positioning each of the arcs to be transversely centered at the inner bottom center of the invert of the host pipe.

6. A method according to claim 1, wherein:
    the one or more troughs have lengths extending in the longitudinal direction of the host pipe that are greater than respective transverse widths.

7. A method according to claim 1, wherein:
    the one or more troughs have lengths extending in the longitudinal direction of the host pipe that are greater than respective transverse widths.

8. A method for repairing at least an inner bottom center of an invert of a host pipe in the form of a culvert or other conduit, said method comprising:
    positioning each of one or more troughs over the bottom center of the invert of the host pipe, the one or more troughs thereby extending along a longitudinal direction of the host pipe and thereby lining the invert without lining an entire interior circumference of the host pipe;
    positioning a plurality of longitudinally spaced-apart ribs beneath the one or more troughs, the ribs not extending significantly beyond longitudinally extending edges of the one or more troughs; and anchoring the one or more troughs to the host pipe; and installing grout in spaces between the one or more trough and the host pipe.

9. A repair apparatus used for the method of claim 8.

10. A method according to claim 8, wherein:

each of the one or more troughs has a transversely extending arc extending between 30 and 180 degrees.

11. A method according to claim 10, wherein:

said positioning one or more troughs comprises positioning each of the arcs to be transversely centered at the inner bottom center of the invert of the host pipe.

\* \* \* \* \*